United States Patent [19]

Hill

[11] Patent Number: 5,464,140
[45] Date of Patent: Nov. 7, 1995

[54] MOUNTING STRUCTURE FOR ROOF RACK SUPPORT MEMBERS

[76] Inventor: Richard Hill, 11556 Woodbridge Blvd., Seminole, Fla. 34642

[21] Appl. No.: 280,795
[22] Filed: Jul. 26, 1994
[51] Int. Cl.⁶ ..................................................... B60R 9/00
[52] U.S. Cl. ........................... 224/321; 224/315; 224/322
[58] Field of Search ............................ 224/321, 322, 224/309, 325, 326, 330, 315, 331

[56] References Cited

U.S. PATENT DOCUMENTS

| 4,239,138 | 12/1980 | Kowalski | 224/321 |
| 4,239,139 | 12/1980 | Bott | 224/325 |
| 4,473,178 | 9/1984 | Bott | 224/321 |
| 4,501,385 | 2/1985 | Bott | 224/321 |
| 4,586,638 | 5/1986 | Prescott et al. | 224/322 |
| 4,736,878 | 4/1988 | Rasor | 224/321 |
| 4,778,092 | 10/1988 | Grace | 224/322 |
| 4,911,348 | 3/1990 | Rasor et al. | 224/321 |
| 4,995,538 | 2/1991 | Marengo | 224/321 |
| 5,133,490 | 7/1992 | Cucheran | 224/321 |
| 5,226,570 | 7/1993 | Pedrini | 224/321 |
| 5,320,264 | 6/1994 | Weir | 224/321 |
| 5,377,888 | 1/1995 | Baravalle | 224/322 |

FOREIGN PATENT DOCUMENTS

| 1333369 | 6/1963 | France | 224/321 |
| 3406149 | 8/1985 | Germany | 224/326 |
| 2185949 | 8/1987 | United Kingdom | 224/315 |

Primary Examiner—Henry J. Recla
Assistant Examiner—Gregory M. Vidovich
Attorney, Agent, or Firm—Watson, Cole, Grindle & Watson

[57] ABSTRACT

The roof of an automotive vehicle is provided with a pair of rails each of which has an upwardly facing slot. A pair of roof rack bars are each provided with an upwardly facing slot and a downwardly facing slot. A pair of roof engaging foot brackets are connected to opposite ends of each bar. A pair of angle members are secured to each bar. A pair of threaded studs extends through clearance holes in each angle member. The lower ends of the studs have enlarged heads which are inserted in the upper slot in a rail and turned into locking position. The upper ends of the studs are provided with flats to indicate the position of the heads. First nuts are threaded on the upper ends of the studs and have spherical surfaces engaging spherical surfaces on the angle members. Cotter pins fit within slots in the first nuts and holes in the angle member. Second nuts are threaded on the lower ends of the studs to engage and hold rail engaging members in position. Padlocks engage security members to prevent the device from being disengaged from the rails. Each security member includes a pin which is received within a slot in one of the first nuts.

14 Claims, 3 Drawing Sheets

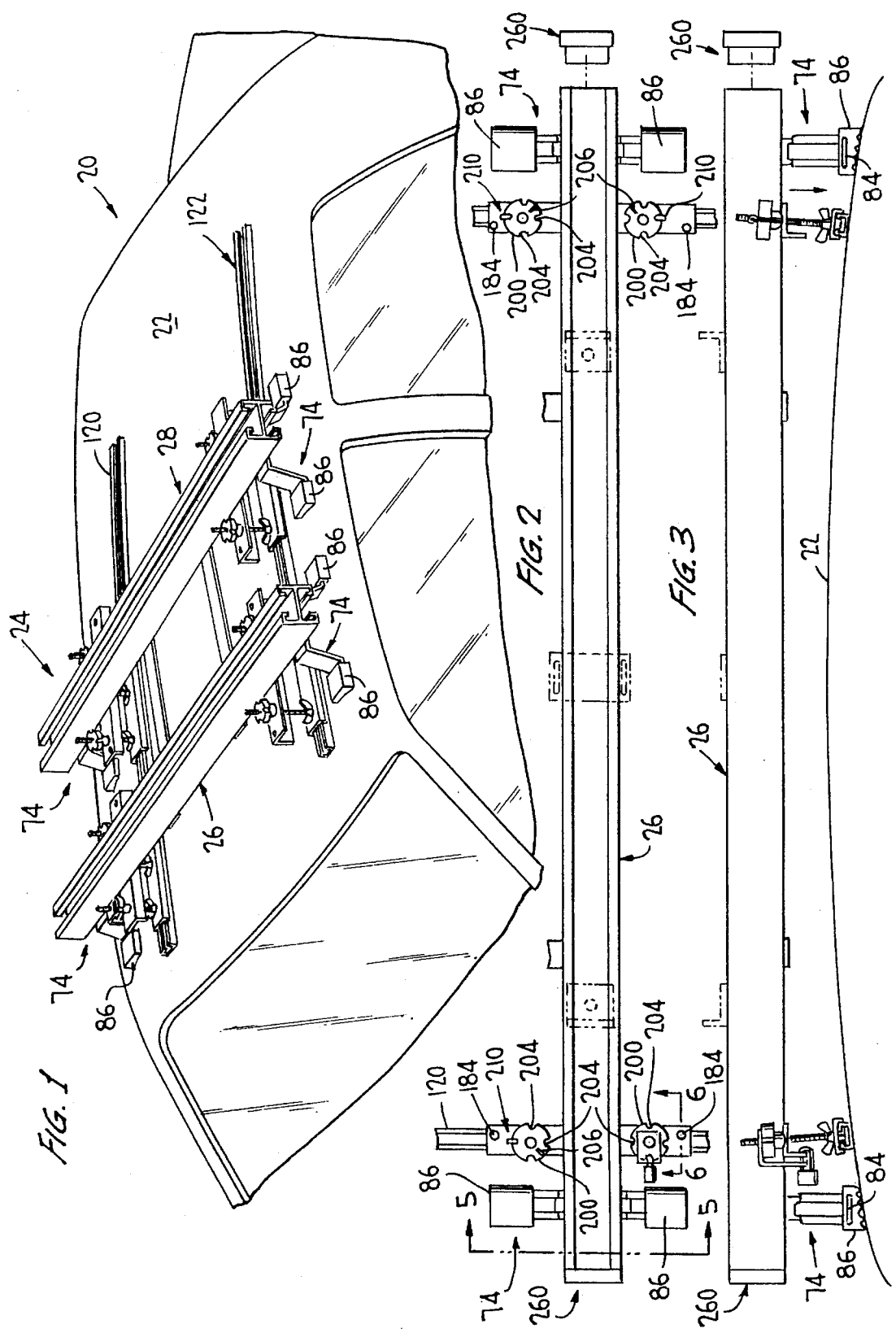

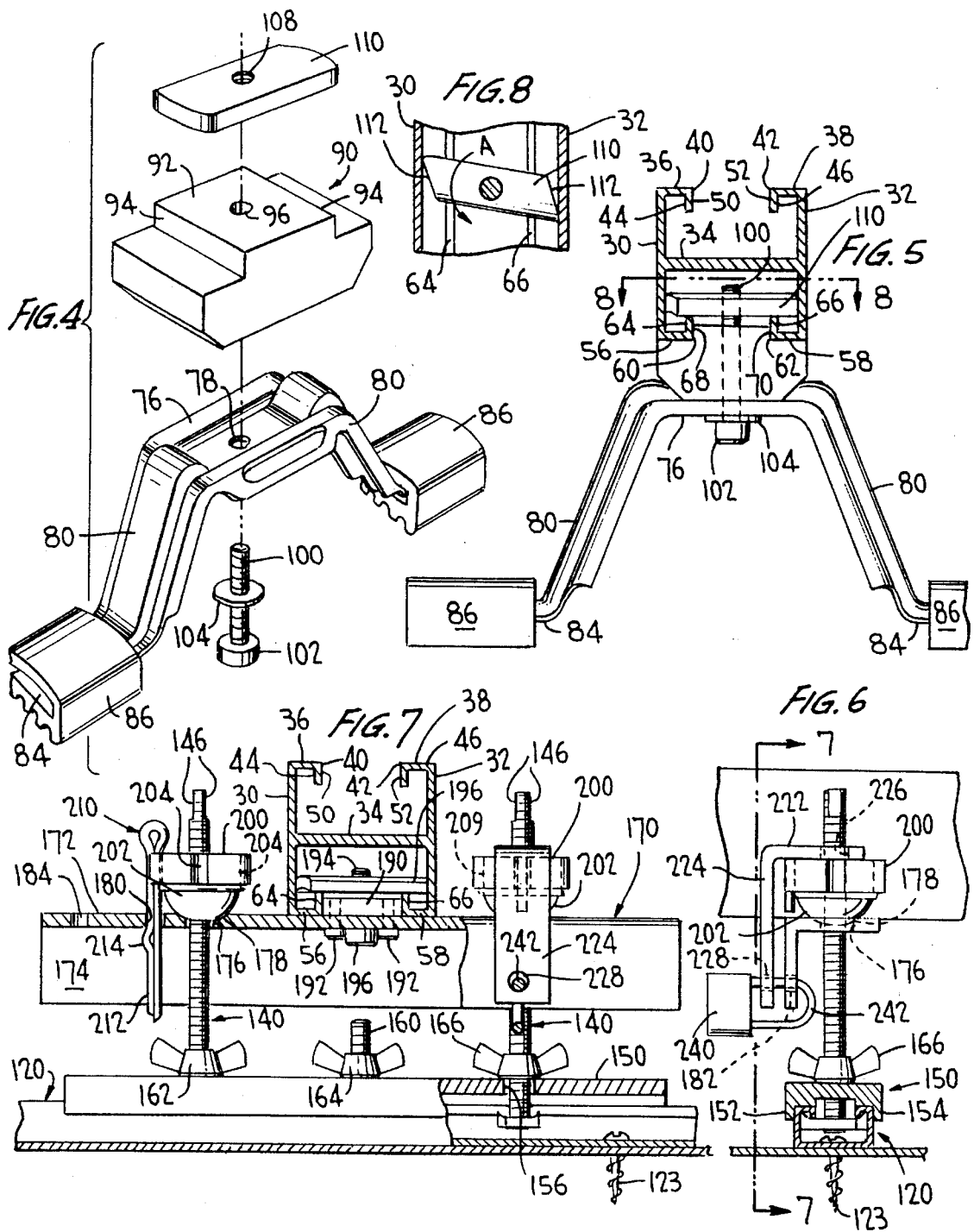

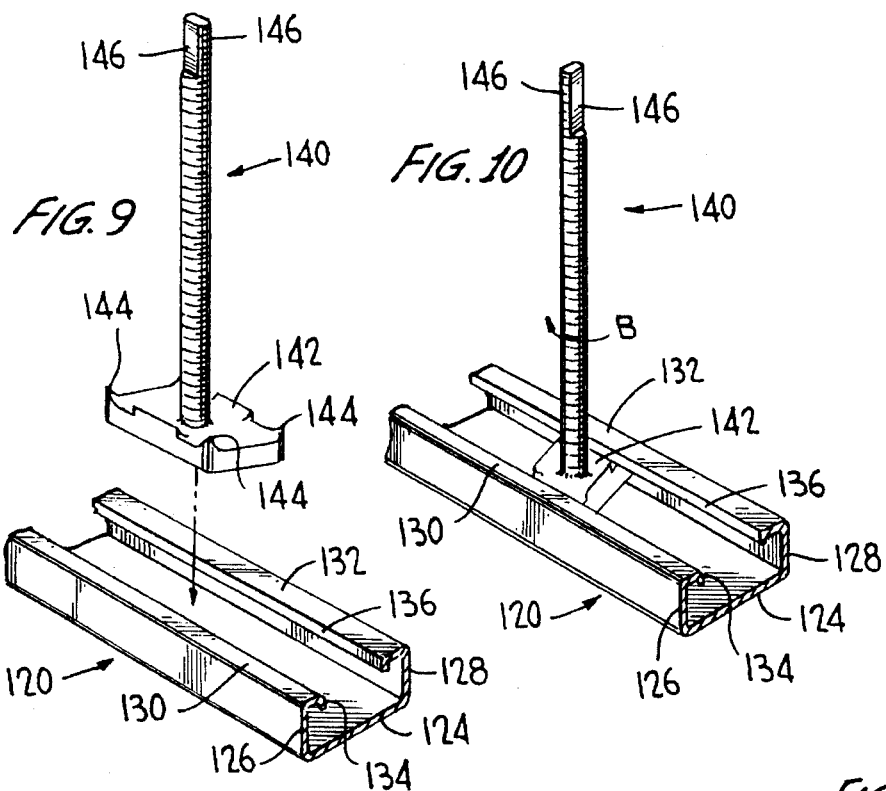
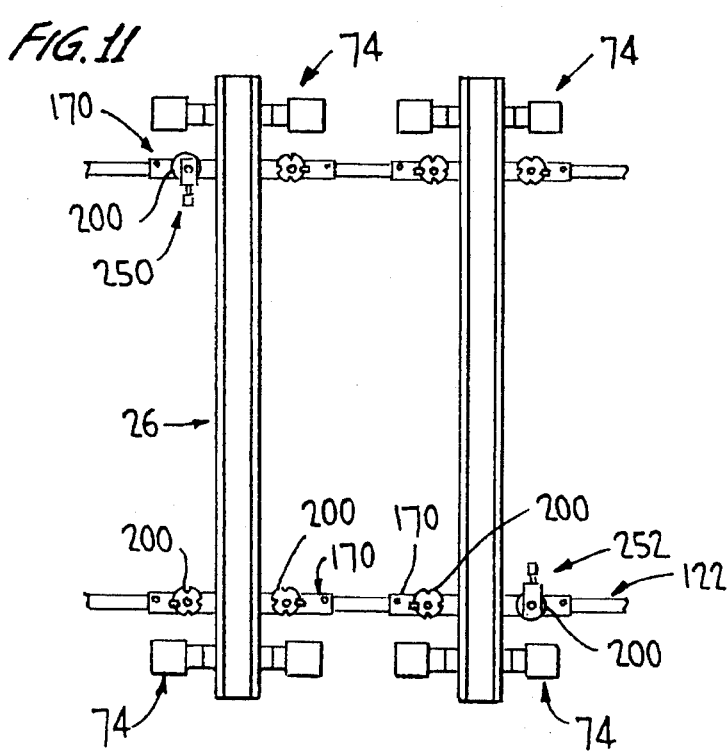
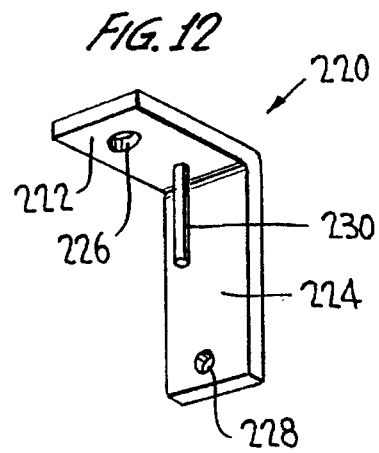

MOUNTING STRUCTURE FOR ROOF RACK SUPPORT MEMBERS

BACKGROUND OF THE INVENTION

The present invention relates to mounting structure for roof rack support members which are supported on the roof of automotive vehicles. The invention is an improvement over the roof rack arrangement disclosed in my copending U.S. patent application Ser. No. 005,389, which has matured into U.S. Pat. No. 5,358,162, the disclosure of which is incorporated herein by reference. Prior art roof racks such as shown in my copending application employ adjustable straps having gutter clips connected thereto which are adapted to clip onto conventional rain gutters disposed at opposite sides of the vehicle roof in overlying relationship to the doors of the vehicle.

New model automotive vehicles have aerodynamic designs which eliminate conventional rain gutters, and accordingly roof racks cannot be anchored to rain gutters as was common in the prior art. An alternative roof rack construction as employed in the prior art is to provide a pair of rails fixed to the roof of a vehicle, such rails extending longitudinally of the vehicle and being spaced from one another laterally of the vehicle. These rails support hardware that can be adjusted and locked at various positions and serve as a means for using ropes or straps to tie down luggage. Such prior art arrangements require rails which are quite wide and and of heavy duty construction in order to support the weight of the luggage thereon and provide necessary stability. As a result, this type of prior art roof rack is quite expensive.

SUMMARY OF THE INVENTION

It is a principal objective of the invention to provide mounting structure for a roof rack which is lightweight and very stable when in operative position, yet which is simple and inexpensive in construction. In addition, the size and expense of the rails secured to the roof of a vehicle can be substantially reduced compared to those required in prior art roof racks.

The invention incorporates a unique construction wherein a pair of rails are permanently bolted to the roof of a vehicle, and the weight of the supported luggage is transferred from a pair of roof rack support members through roof engaging members directly to the roof of the vehicle. The mounting structure creates an upward force on the rails which generates an opposing downward force on the roof engaging members to firmly hold the roof rack in operative position. The only force applied to the rails is that which is required to hold the roof rack in position on the roof of the vehicle, while the vertical and side loads on the roof rack produced by luggage supported on the roof rack is transferred to the roof of the vehicle through the roof engaging members.

The luggage is supported on a pair of spaced roof rack support members. A pair of roof engaging members is adjustably secured to opposite ends of each of the roof rack support members. Threaded studs engage the rails on the roof of the vehicle and pass through clearance holes in rigid angle members which are connected to the roof rack support members. Threaded nuts are threaded on the upper ends of the studs and engage the rigid angle members to urge the roof rack support members downwardly which in turn causes the roof engaging members to be tightly clamped against the roof of a vehicle. Rail engaging members have depending side walls for engaging and reinforcing the side walls of the associated rails, thereby permitting the rails to be of minimum size and strength. Securing members engage the rail engaging members for securing the rail engaging members means in engagement with the rails.

The rails each have an upwardly opening slot formed therein, and the ends of the rails are preferably provided with caps to provide a good aesthetic appearance. The studs have oblong heads at the lower ends thereof so that the studs can be inserted into the slots in the rails at any point along the length of the rails. The studs also have indicating means thereon in the form of flats at the upper ends of the studs to indicate when the oblong heads on the ends of the studs are turned to be at generally right angles to the slots in the rail so that a person assembling the mounting structure can readily determine that the heads on the studs are properly positioned when anchoring the structure onto the roof of a vehicle.

In order to ensure that the threaded nuts engaging the rigid angle members do not loosen or back off from their operative position during use of the mounting structure, retainer means in the form of cotter pins are utilized. These cotter pins fit within slots formed in the threaded nuts engaging the rigid angle members, the cotter pins also passing through suitable retainer holes provided in the angle members. The cotter pins each include a pair of legs one of which is provided with an offset portion to prevent the cotter pins from inadvertently passing through the retainer holes when the cotter pins are in operative position. The angle members are also provided with storage holes for holding the cotter pins when not in use.

The threaded nuts engaging the rigid angle members are provided with spherical surfaces on the bottom thereof which are adapted to engage complementary spherical surfaces surrounding the clearance holes in the rigid angle members. The rails on the roof of the vehicle will never be in a perfectly horizontal position due to the countour of the roof of the vehicle. The spherical surfaces enable the studs to be self-aligning so that they are disposed substantially perpendicular to the rails to provide uniform engagement of the heads of the studs on the rails. The threaded nuts engaging the rigid angle members also have markers thereon so that proper tension may be placed on the rails by the studs. When it is desired to anchor the mounting structure to the rails, the nuts on the threaded studs are rotated to move downwardly until they just touch the rigid angle members. The nuts are then turned two more complete turns as shown by the markers to anchor the structure in place. Care must be taken not to overtighten the mechanism since the rails could be pulled away from the roof.

A security member is provided in the form of a rigid substantially L-shaped member having a pair of legs each of which has a hole formed therethrough. A conventional padlock having the usual shackle is provided. A first hole in the security member receives the upper end of one of the threaded studs, and a second hole in the security member is aligned with a security hole in the rigid angle member. The shackle passes through the aligned holes when the padlock is in locked position. This arrangement prevents the mounting structure from being loosened and prevents the roof rack support members from being removed. In addition, the security member is provided with a pin which is adapted to fit within one of the slots in the threaded nuts to retain the nuts in operative position, thereby eliminating the necessity of providing a cotter pin for retaining the threaded nuts in position.

BRIEF DESCRIPTION OF THE DRAWINGS

FIG. 1 is a top perspective view of a roof rack and mounting structure on the roof of an automotive vehicle;

FIG. 2 is a top view of a portion of the structure of FIG. 1;

FIG. 3 is a front view of the structure shown in FIG. 3;

FIG. 4 is an exploded perspective view of a roof engaging member of the invention;

FIG. 5 is a sectional view on an enlarged scale taken on line 5—5 of FIG. 2;

FIG. 6 is a sectional view on an enlarged scale taken on line 6—6 of FIG. 2;

FIG. 7 is a sectional view taken on line 7—7 of FIG. 6;

FIG. 8 is a sectional view taken on line 8—8 of FIG. 5;

FIG. 9 is an exploded perspective view of a threaded stud and head construction for engagement with a rail of with the invention;

FIG. 10 is a view similar to FIG. 10 showing the head of the stud in assembled relationship with the rail;

FIG. 11 is a top view of the roof rack and mounting structure shown in FIG. 1; and FIG. 12 is a perspective view of the security member of the invention.

DESCRIPTION OF THE PREFERRED EMBODIMENT

Referring now to the drawings wherein like reference characters designate corresponding parts throughout the several views, there is shown in FIG. 1 an automobile 20 having a roof 22 without conventional rain gutters over the doors. A roof rack 24 includes a pair of identical elongated rigid bars or support members 26 and 28 formed of extruded aluminum. Each of these bars has a cross-sectional configuration as shown in FIGS. 5 and 7 including a pair of spaced side walls 30 and 32 having facing surfaces thereon. A web portion 34 is connected between the facing surfaces and divides the side walls into upper and lower portions having upper and lower edges respectively. A pair of upper walls 36 and 38 extend toward one another from the upper edges of the side walls and terminate short of one another to define spaced inner edges 40 and 42. A pair of depending wall portions 44 and 46 extend from the inner edges of the upper walls toward web portion 34. Wall portions 44 and 46 also define inner surfaces 50 and 52 thereon.

A pair of lower walls 56 and 58 extend toward one another from the lower edges of the side walls and terminate short of one another to define spaced inner edges 60 and 62. A pair of upstanding wall portions 64 and 66 extend upwardly from the inner edges of the lower walls. Wall portions 64 and 66 also define inner surfaces 68 and 70 thereon.

The inner edges 40 and 42 of the upper walls and the inner surfaces 50 and 52 of the depending wall portions define an upper slot therebetween; and the inner edges 60 and 62 of the lower walls and the inner surfaces 68 and 70 of the upstanding wall portions define a lower slot therebetween.

As seen in FIGS. 1–3, each of the roof rack bars is provided with a pair of roof engaging support means 74 of conventional construction comprising foot brackets which as seen in FIGS. 4 and 5 include a top portion 76 having a hole 78 formed therethrough. A pair of legs 80 extend downwardly from top portion 76 an an angle thereto and terminate in feet 84. These feet are surrounded by rubber portions 86 having grooves formed in the bottom and having varying thickness to conform to the shape of the roof in a known manner.

The foot brackets are infinitely adjustably connected to an associated bar by the detachable connecting means shown in FIGS. 4 and 5. A solid block of aluminum 90 includes a central upstanding portion 92 thereon having opposite parallel side wall portions 94 which are adapted to fit within the lower slot formed in bar 26. A hole 96 is formed completely through the block. A bolt 100 has an enlarged head 102 with a countersunk socket therein for receiving an end wrench. A washer 104 is disposed about the bolt adjacent the head, the bolt passing upwardly through hole 78 and being threaded into a correspondingly threaded hole 108 in a locking member 110.

As seen in FIG. 8, locking member 110 is of oblong construction including sloping end surfaces 112 which are adapted to engage the side walls 30 and 32 of the associated bar when the bolt 102 is turned in the direction of arrow A. The roof engaging support means may be infinitely adjusted along the length of the associated bar and then locked in position by locking member 110. When it is desired to move the roof engaging support means, bolt 100 can be loosened, and then retightened in a new location. Locking member 110 can be inserted into or removed from the lower slot in bar 26 at any point along the length of the bar when the locking member is turned to a position so that the long dimension of the locking member is parallel with the lower slot through which it can freely pass since the width of member 110 is less than that of the slot.

Spacer means can be employed for maintaining bars 24 and 26 in optimum spaced relationship, and suitable hold down brackets and inertia brackets may be mounted in the upper slot of the bars 24 and 26 as disclosed in my aforementioned copending patent application.

A pair of similar rails 120 and 122 formed of stainless steel are suitably connected by bolts 123 to the roof of the vehicle. Rail 120 includes a bottom wall 124 joining a pair of upwardly extending side walls 126 and 128 which in turn join a pair of inwardly extending top walls 130 and 132 which terminate in downwardly and inwardly extending lips 134 and 136.

A plurality of similar threaded studs 140 are provided, one of such studs being shown in detail in FIG. 9. The stud is threaded throughout the length thereof and has an enlarged head 142 attached to one end thereof. This head may be of oblong configuration similar to that of locking member 110 so that the head may be inserted at any point along the upwardly directed slot formed in the associated rail between the lips 134 and 136 thereof. Once the head is inserted through the slot in the rail, it can be rotated in the direction indicated by arrow B in FIG. 10 so that the lengthwise direction of the head is disposed generally perpendicular to the slot. The head is shown as being provided with sharp points 144 at the corners thereof for gripping the undersurface of the top walls 130 and 132 of the rail.

When the structure of the invention is assembled, it is difficult to determine when the heads of the studs are in the position shown in FIG. 10 due to other components of the mounting structure described hereinafter. In order that the position of the heads may be determined, indicating means is provided on the studs in the form of flats 146 formed on the top end of the studs at opposite sides thereof. When the flats are generally perpendicular to the slot of the associated rail, the heads of the studs are in the position shown in FIG. 10, whereas when the flats are generally parallel with the slot in the associated rail, the heads are in a position to permit the heads to be inserted into or removed from the slot in an associated rail. It is apparent that when the heads are in the position shown in FIG. 10, the studs are adapted to exert an upward force on the associated rail.

Referring to FIGS. 6 and 7, a pair of spaced studs 140 have been inserted in the slot in rail 120 and extend upwardly from the rail. A rail engaging member 150 is formed of thick aluminum and has a cross-sectional configuration as shown in FIG. 6 including opposite depending side walls 152 and 154. The cross-section of member 150 is such that it snugly receives the side walls 126 and 128 and the top walls 130 ands 132 of the associated rail 120 to effectively provide a box-section thereby reinforcing the rail at the point where the studs pull up on the rail to clamp the structure in operative position. This enables the rail to be of light weight construction thereby reducing the cost thereof and allowing the rail to follow the contour of the roof of a vehicle.

Rail engaging member 150 has a pair of spaced clearance holes 156 formed through the central longitudinal portion thereof, the studs 140 passing freely through these clearance holes. A shorter stud 160 is provided with an oblong head (not shown) similar to that illustrated in FIG. 9, the stud passing through a third clearance hole (not shown) in member 150. Three similar wing nuts 162, 164 and 166 are threaded on the studs 140, 160 and 140 respectively. The wing nuts can be threaded downwardly to the position shown in FIG. 7 to engage the top surface of member 150 to urge member 150 down into the position shown in FIGS. 6 and 7 so that the rail engaging member and the rail are clamped together.

A rigid member comprises an angle member 170 formed of thick aluminum, member 170 including a horizontal portion 172 and a vertical portion 174. Portion 172 has a pair of clearance holes 176 formed therethrough, a portion of a spherical surface 178 being machined into the upper surface of portion 172 around each of the clearance holes. A pair of spaced similar retainer holes 180 are formed through portion 172, and a security hole 182 is formed through portion 174. A pair of spaced storage holes 184 are also formed through portion 172. The purpose of these various holes is explained hereinafter.

The rigid members 170 are adjustable along the length of the associated bars and each include a rigid key member 190 which may be integral with the rigid member or may comprise a separate member suitably connected to the rigid member. The key member is adapted to fit snugly within the lower slot in the associated bar so that the rigid member is prevented from turning with respect to the bar. As shown, key member 190 is fixed to the rigid member 170 by a plurality of bolts 192 passing through suitable holes provided in portion 172 of the rigid member and threaded into suitable threaded holes provided in key member 190. A further bolt 194 has an enlarged head 196 with a countersunk socket therein for receiving an end wrench. Bolt 194 extends upwardly through suitable holes formed through portion 172 of the rigid member and the key member 190 and is threaded into a threaded hole provided through the center of an oblong locking member 196 similar to locking member 110 previously described. The end surfaces of locking member 196 are adapted to engage the side walls 30 and 32 of the associated bar when the bolt is turned to lock the rigid member in place on the associated bar.

A threaded nut 200 is threaded on the upper end of each of the threaded studs 140. Each nut is provided with a spherical surface 202 formed on the undersurface thereof which is adapted to engage the portion 178 of a spherical surface surrounding each of the clearance holes so that the studs will be self-aligning with respect to the associated rail as previously discussed. Each nut is also provided with a plurality of slots 204 which may be four in number, these slots being formed equidistantly from one another in the outer periphery of nuts 200 and extending in a direction parallel with studs 140.

As seen in FIG. 2, each of the nuts 200 is provide with marker means in the form of mark 206 on the upper surface thereof to indicate the angular position of the nuts. When a nut has been tightened into the desired position, one of the slots on a nut is aligned with a retainer hole 180 formed through the rigid member, and a cotter pin 210 is placed in a groove in the nut and inserted through a retainer hole 180 in the rigid member to hold the nut in the desired position. As seen in FIG. 7, each cotter pin includes a pair of legs 212 one of which has an offset portion 214 formed thereon. This offset portion prevents the cotter pin from inadvertently passing upwardly through the associated retainer hole 180, yet permits the cotter pin to be pulled out of the retainer hole by a person's fingers.

As seen in FIG. 12, a security member 220 is generally L-shaped and includes a horizontal leg 222 and a vertical leg 224. Holes 226 and 228 are formed through legs 222 and 224 respectively. A pin 230 extends downwardly from the undersurface of leg 222. When the security member is in operative position as shown in FIGS. 6 and 7, hole 226 receives the upper end of one of the studs 140, and hole 228 is aligned with security hole 182 in the rigid member. In addition, the pin 230 is disposed within one of the slots 204 in the associated nut 200, thereby preventing the nut from being backed off. A conventional padlock 240 has the usual shackle 242 which extends through the aligned holes in leg 224 and the rigid member to lock the security member to the rigid member.

When the lock is locked to hold the security member in the position shown in FIGS. 6 and 7, the associated nut 200 cannot be backed off, and accordingly the associated stud cannot be turned to a position wherein the head thereof would be parallel with the slot in the associated rail so that the structure could be removed from the rail. Furthermore, a person cannot remove the nut which would allow the rigid members and the bars to be removed from the rest of the mounting structure. Obviously, when a security member is used, a cotter pin is not used with the nut which is held in place by pin 230 of the security member.

As seen in FIG. 11, a first security member and lock assembly 250 is used with support member 26 at one side of the vehicle, and a second security member and lock assembly 252 is used with support member 24 at the other side of the vehicle. The assemblies 250 and 252 are accordingly used at diagonally opposite positions of the roof rack which is formed by support members 24 and 26. All of the remaining threaded nuts are held in position by cotter pins. The cotter pins may be inserted in the storage holes 184 when not in use holding the nuts in position.

As seen in FIGS. 2 and 3, end caps 260 may be provided at opposite ends of each of support members 24 and 26 to provide a better appearance. These end caps may be secured in position by any suitable means such as an adhesive or the like.

The invention has been described with reference to a preferred embodiment. Obviously, various modifications, alterations and other embodiments will occur to others upon reading and understanding this specification. It is our intention to include all such modifications, alterations and alternate embodiments insofar as they come within the scope of the appended claims or the equivalent thereof.

What is claimed is:

1. Mounting structure for roof rack support members adapted to be connected to rails attached to the roof of an automotive vehicle comprising, a pair of spaced elongated support members, roof engaging support means connected to each of said support members for engaging the roof of said automotive vehicle, rigid means connected to each of said support members for movement therewith and being spaced from said roof engaging support means, force transmitting means for engaging each of said rails and force applying means operatively connected to each of said force transmitting means and operatively engaging said rigid means for forcing said rigid means and the connected support members downwardly to cause said roof engaging means to be moved into tight engagement with the roof of said automotive vehicle, said force transmitting means comprising a plurality of elongated threaded members and said force applying means comprising a plurality of complementary threaded members in threaded engagement with said elongated threaded members, said complementary threaded members having slots formed therein, said rigid means having holes formed therein, and retainer means disposed within said holes and said slots for retaining said complementary threaded members in position relative to said rigid means.

2. Mounting structure for roof rack support members adapted to be connected to rails attached to the roof of an automotive vehicle comprising, a pair of spaced elongated support members, roof engaging support means connected to each of said support members for engaging the roof of said automotive vehicle, rigid means connected to each of said support members for movement therewith and being spaced from said roof engaging support means, force transmitting means for engaging each of said rails, and force applying means operatively connected to each of said force transmitting means and operatively engaging said rigid means for forcing said rigid means and the connected support members downwardly to cause said roof engaging means to be moved into tight engagement with the roof of said automotive vehicle, a security member having first and second holes formed therethrough, said rigid means having a security hole formed therethrough, a lock having a shackle, said first hole receiving said force transmitting means, said second hole and said security hole receiving said shackle for preventing the mounting structure from being disengaged from said rails.

3. Mounting structure as defined in claim 2 wherein said security member has a pin connected thereto, said complementary threaded members having slots formed therein for receiving said pin.

4. Mounting structure for roof rack support members adapted to be connected to rails attached to the roof of an automotive vehicle comprising, a pair of spaced elongated support members, each of said support members having an upper slot and a lower slot formed therein, roof engaging support means adjustably mounted in said lower slot of each of said support members, rigid members connected to spaced portions of each of said support members for movement therewith and being spaced from said roof engaging support means, threaded studs having a head at one end for engaging the rails attached to the roof of the other end of said automotive vehicle, said rigid members having clearance holes formed therethrough, the other end of said studs extending through said clearance holes, and threaded nuts threaded on said other end of said threaded studs, said nuts operatively engaging said rigid means for forcing said rigid means and the connected support members downwardly to cause said roof engaging means to be moved into tight engagement with the roof of said automotive vehicle, and including retainer means comprising cotter pins, said nuts each having a plurality of slots formed therein, said rigid members having retainer holes formed therethrough, each of said cotter pins being received within one of said slots and one of said retainer holes when the retainer means is in a retaining position to prevent movement of said nuts about said threaded studs.

5. Mounting structure as defined in claim 4 wherein each of said cotter pins has an pair of legs, one of said legs having an offset portion preventing the cotter pin from inadvertently passing through the associated retainer hole.

6. Mounting structure for roof rack support members adapted to be connected to rails attached to the roof of an automotive vehicle comprising, a pair of spaced elongated support members, each of said support members having an upper slot and a lower slot formed therein, roof engaging support means adjustably mounted in said lower slot of each of said support members, rigid members connected to spaced portions of each of said support members for movement therewith and being spaced from said roof engaging support means, threaded studs having a head at one end for engaging the rails attached to the roof of said automotive vehicle, said rigid members having clearance holes formed therethrough, the other end of said studs extending through said clearance holes, and threaded nuts threaded on said other end of said threaded studs, said nuts operatively engaging said rigid means for forcing said rigid means and the connected support members downwardly to cause said roof engaging means to be moved into tight engagement with the roof of said automotive vehicle, each of said nuts having a spherical surface thereon, said rigid members each having a spherical surface thereon surrounding a clearance hole therethrough, the spherical surface of each nut being in engagement with a spherical surface on a rigid member.

7. Mounting structure for roof rack support members adapted to be connected to rails attached to the roof of an automotive vehicle comprising, a pair of spaced elongated support members, each of said support members having an upper slot and a lower slot formed therein, roof engaging support means adjustably mounted in said lower slot of each of said support members, rigid members connected to spaced portions of each of said support members for movement therewith and being spaced from said roof engaging support means, threaded studs having a head at one end for engaging the rails attached to the roof of said automotive vehicle, said rigid members having clearance holes formed therethrough, the other end of said studs extending through said clearance holes, and threaded nuts threaded on said other end of said threaded studs, said nuts operatively engaging said rigid means for forcing said rigid means and the connected support members downwardly to cause said roof engaging means to be moved into tight engagement with the roof of said automotive vehicle, and including a security member having first and second holes formed therethrough, said rigid member having a security hole formed therethrough, a lock having a shackle, said first hole receiving one of said studs, said second hole and said security hole receiving said shackle for preventing the mounting structure from being disengaged from said rails.

8. Mounting structure as defined in claim 7 wherein said security member has a pin thereon, each of said nuts having slots formed therein each of which is adapted to receive said pin therein.

9. In combination, a pair of rails for attachment to the roof of an automotive vehicle, said rails each having an upwardly facing slot formed therein and including side walls having interior and exterior surfaces, a mounting structure for roof rack support members comprising, a pair of spaced elongated support members, roof engaging support means connected to each of said support members for engaging the roof of said automotive vehicle, a pair of rigid members connected to each of said support members and being spaced from said roof engaging support means, each of said rigid members having a pair of spaced clearance holes formed therein, a plurality of threaded studs, each of said threaded studs extending through one of said clearance holes and having a head at one end thereof disposed within one of said rails for interengagement, a plurality of first threaded nuts, each of said first threaded nuts being threaded on one of said studs at the other end of said stud and engaging one of said rigid members for forcing said support members downwardly to cause said roof engaging means to be moved into tight engagement with the roof of the automotive vehicle, rail engaging means movably mounted on each of said studs having depending side walls for engaging and reinforcing said exterior surface of said side walls of the rails, and securing means operatively connected to said threaded studs and engaging said rail engaging means for drawing said rail engaging means downwardly toward said rail securing the rail engaging means in engagement with said rails, said securing means including a second plurality of threaded nuts, each of said second threaded nuts being threaded on one of said studs and engaging said rail engaging means.

10. Mounting structure as defined in claim 9 wherein said securing means includes an additional threaded stud passing through a clearance hole in said rail engaging means, and a further threaded nut on said additional stud, said further threaded nut engaging said rail engaging means.

11. In combination, a pair of rails for attachment to the roof of an automotive vehicle, said rails each having an upwardly facing slot formed therein and including side walls having interior and exterior surfaces, and a mounting structure for roof rack support members comprising, a pair of spaced elongated support members, roof engaging support means connected to each of said support members for engaging the roof of said automotive vehicle, a pair of rigid members connected to each of said support members and being spaced from said roof engaging support means, each of said rigid members having a pair of spaced clearance holes formed therein, a plurality of threaded studs, each of said threaded studs extending through one of said clearance holes and having a head at one end thereof disposed within one of said rails for interengagement, a plurality of first threaded nuts, each of said first threaded nuts being threaded on one of said studs at the other end of said stud and engaging one of said rigid members for forcing said support members downwardly to cause said roof engaging means to be moved into tight engagement with the roof of the automotive vehicle, rail engaging means movably mounted on each of said studs having depending side walls for engaging and reinforcing said exterior surface of said side walls of the rails, and securing means operatively connected to said threaded studs and engaging said rail engaging means for drawing said rail engaging means downwardly toward said rail securing the rail engaging means in engagement with said rails, and including retainer members for retaining each of said nuts in position, said nuts each having a plurality of slots formed therein, said rigid member having retainer holes formed therein, each of said retainer members being disposed within one of said slots and one of said retainer holes.

12. In combination, a pair of rails for attachment to the roof of an automotive vehicle, said rails each having an upwardly facing slot formed therein and including side walls having interior and exterior surfaces, and a mounting structure for roof rack support members comprising, a pair of spaced elongated support members, roof engaging support means connected to each of said support members for engaging the roof of said automotive vehicle, a pair of rigid members connected to each of said support members and being spaced from said roof engaging support means, each of said rigid members having a pair of spaced clearance holes formed therein, a plurality of threaded studs, each of said threaded studs extending through one of said clearance holes and having a head at one end thereof disposed within one of said rails for interengagement, a plurality of first threaded nuts, each of said first threaded nuts being threaded on one of said studs at the other end of said stud and engaging one of said rigid members for forcing said support members downwardly to cause said roof engaging means to be moved into tight engagement with the roof of the automotive vehicle, rail engaging means movably mounted on each of said studs having depending side walls for engaging and reinforcing said exterior surface of said side walls of the rails, and securing means operatively connected to said threaded studs and engaging said rail engaging means for drawing said rail engaging means downwardly toward said rail securing the rail engaging means in engagement with said rails, each of said nuts having a spherical surface thereon, said rigid members each having a spherical surface thereon surrounding each clearance hole formed therethrough, the spherical surface of each nut being in engagement with a spherical surface on a rigid member.

13. In combination, a pair of rails for attachment to the roof of an automotive vehicle, said rails each having an upwardly facing slot formed therein and including side walls having interior and exterior surfaces, and a mounting structure for roof rack support members comprising, a pair of spaced elongated support members, roof engaging support means connected to each of said support members for engaging the roof of said automotive vehicle, a pair of rigid members connected to each of said support members drawing said rail engaging means downwardly toward said rail, each of said rigid members having a pair of spaced clearance holes formed therein, a plurality of threaded studs, each of said threaded studs extending through one of said clearance holes and having a head at one end thereof disposed within one of said rails for interengagement, a plurality of first threaded nuts, each of said first threaded nuts being threaded on one of said studs at the other end of said stud and engaging one of said rigid members for forcing said support members downwardly to cause said roof engaging means to be moved into tight engagement with the roof of the automotive vehicle, rail engaging means movably mounted on each of said studs having depending side walls for engaging and reinforcing said side walls of the rails, and securing means operatively connected to said exterior surface of said threaded studs and engaging said rail engaging means for drawing said rail engaging means downwardly toward said rail securing the rail engaging means in engagement with said rails, and including a security member having first and second holes formed therethrough, said rigid member having a security hole formed therethrough, a lock having a shackle, said first hole receiving one of said studs, said second hole and said security hole receiving said shackle for preventing the mounting structure from being disengaged from said rails.

14. Mounting structure as defined in claim 13 wherein said security member has a pin thereon, each of said nuts having slots formed therein each of which is adapted to receive said pin therein.

* * * * *